May 9, 1944. F. J. F. SOLIS 2,348,579
DETACHABLE COVER FOR VEHICLES AND THE LIKE
Filed Sept. 26, 1942 3 Sheets-Sheet 1
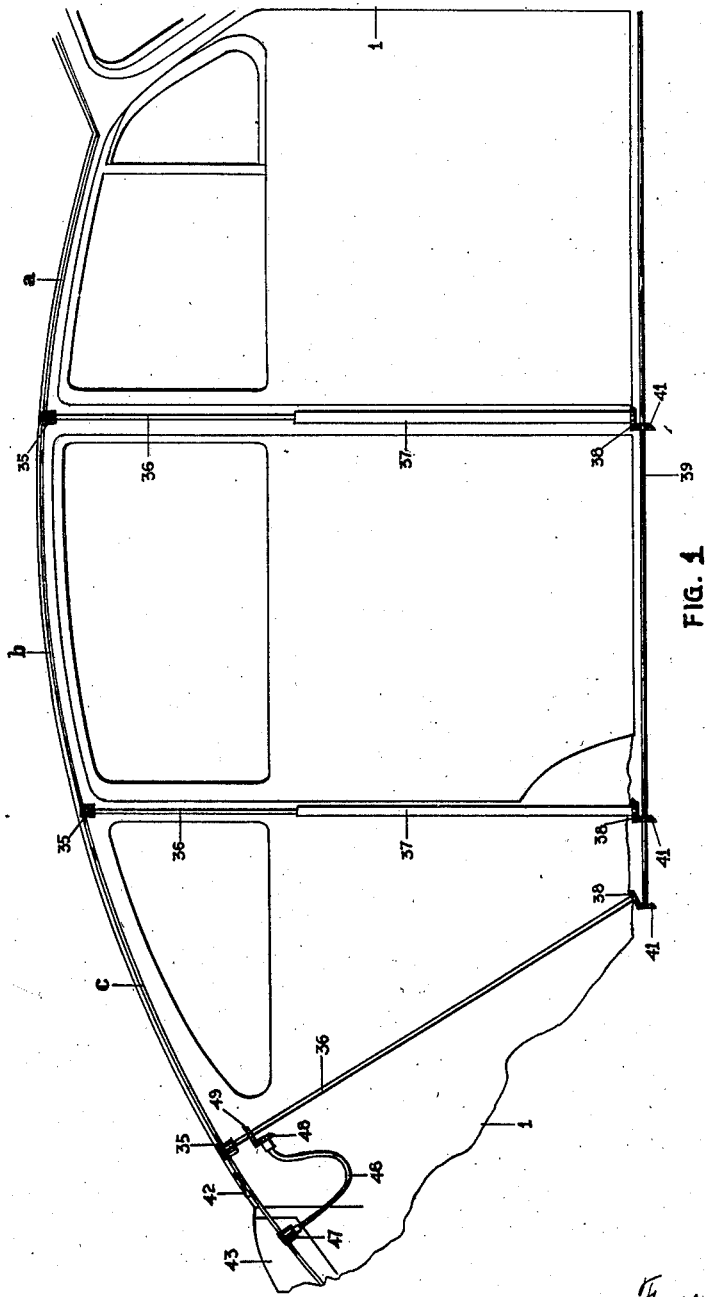
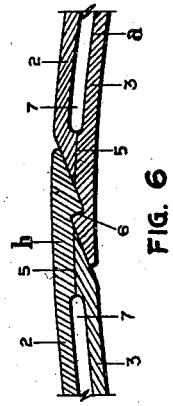
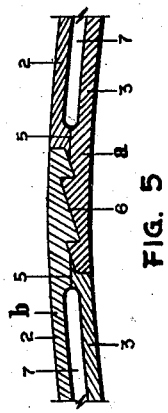
Inventor:
Faustino José Fernandez Solis
by
Singer, Ehlert, Stern & Carlberg
Attorneys May 9, 1944.　　　　　F. J. F. SOLIS　　　　　2,348,579
DETACHABLE COVER FOR VEHICLES AND THE LIKE
Filed Sept. 26, 1942　　　3 Sheets-Sheet 2
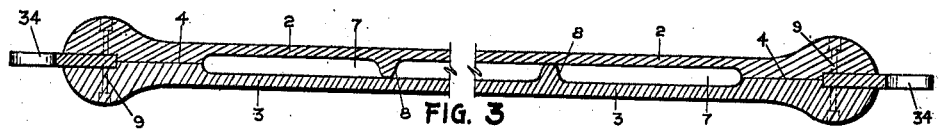
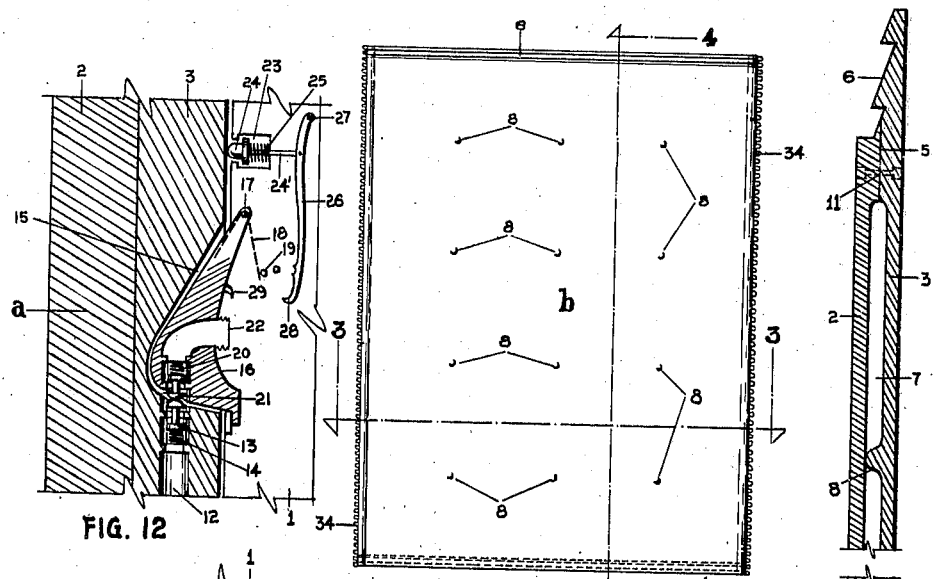
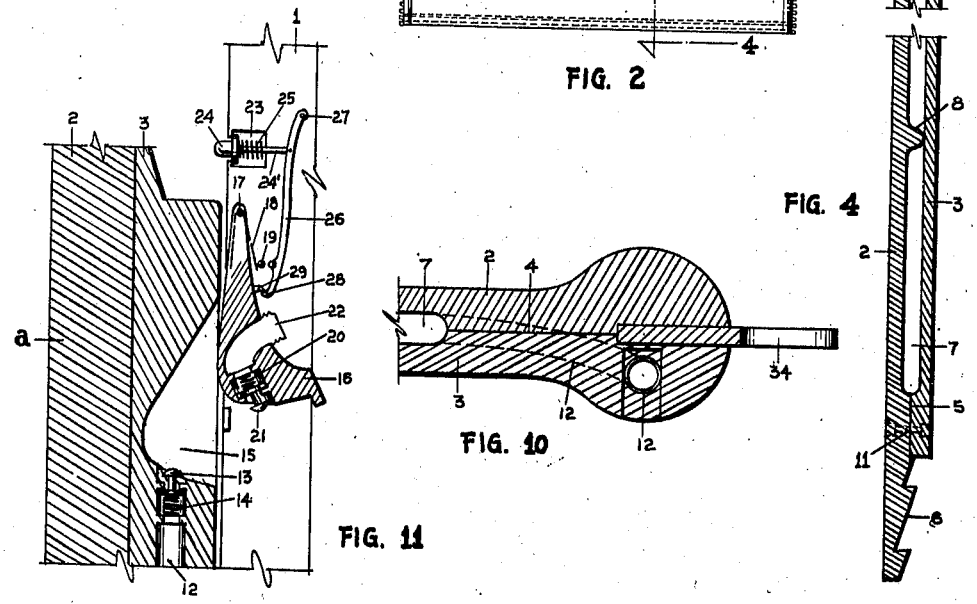
Inventor:
Faustino Joel Fernandy Solis
by
Singer, Ehlert, Stern & Carlberg
Attorneys

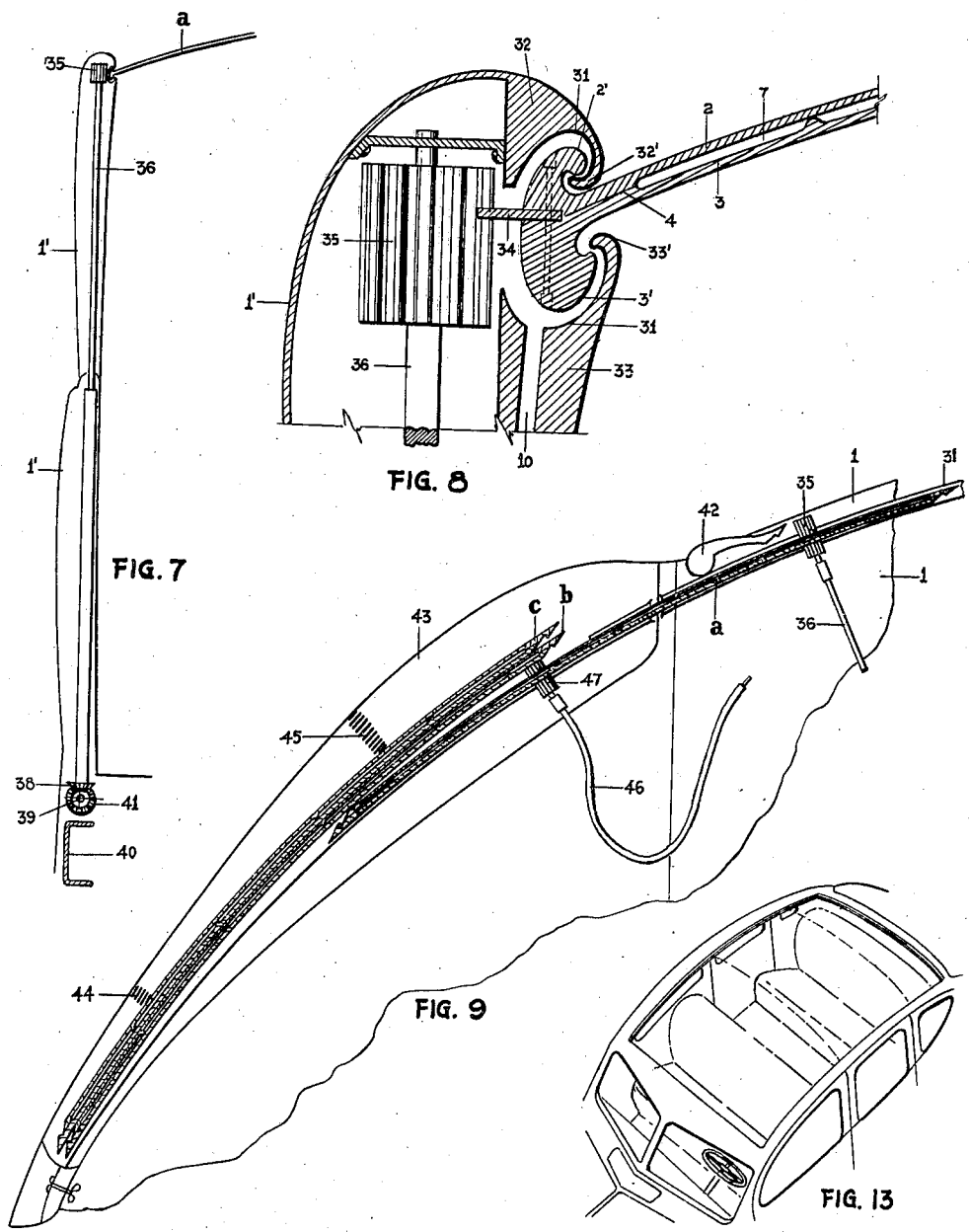

Patented May 9, 1944

2,348,579

UNITED STATES PATENT OFFICE 2,348,579

DETACHABLE COVER FOR VEHICLES AND THE LIKE

Faustino José Fernández Solis, Habana, Cuba

Application September 26, 1942, Serial No. 459,812
In Cuba September 29, 1941

4 Claims. (Cl. 296—137)

This invention relates to movable covers or tops for automobiles and other vehicles but the invention also can be applied to other structures having a removable top.

It is an object of the invention to provide a cover or top composed of a plurality of sections which can be shifted to operative position covering the otherwise open top of the structure or can be shifted to a position remote from the open top so as to free the structure from the top.

Another object of the invention is to provide a top or cover of this character which may normally be transparent to permit the passengers to view the surrounding scenery through the sections of the cover when it is in position or which may be rendered opaque as desired so as to hide the passengers from the view of persons above the structure.

It is also an object of the invention to provide a cover of this character of a plurality of sections, each section being assembled of transparent panels which are spaced from each other to provide an interspace into which an opaque fluid can be introduced whenever desired.

It is, furthermore, an object of the invention to provide a cover of this character from a plurality of sections which are individually guided in longitudinal channels of the structure, and which have elements projecting from the edges of the sections into these channels for cooperation with actuating elements disposed within the channels of the structure itself.

With these and numerous other objects in view, embodiments of the invention are illustrated in the accompanying drawings, to which reference is made in the following specification:

In the drawings,

Fig. 1 is a fragmentary longitudinal vertical section of an automobile body, showing the cover in position and showing diagrammatically the means for actuating the cover.

Fig. 2 is a top plan view of a section of this cover.

Fig. 3 is a transverse sectional view through a cover section on line 3—3 of Fig. 2 on a larger scale.

Fig. 4 is a longitudinal sectional view on line 4—4 of Fig. 2 through a cover section on a larger scale.

Fig. 5 is a fragmentary longitudinal vertical sectional view of the overlapping end portions of two cover sections in operative position.

Fig. 6 is a similar sectional view of overlapping end portions of cover sections;

Fig. 7 shows diagrammatically in sectional view the actuating means for expanding and retracting the cover sections.

Fig. 8 is a fragmentary sectional view on a larger scale through guide portions of a vehicle body and the cover section supported for actuation in said guide portion.

Fig. 9 is a fragmentary sectional view of a pair of sections in partly contracted arrangement, with the body of the automobile being shown in elevation.

Fig. 10 is a detail sectional view through the lateral edge portion of a cover section on a larger scale;

Fig. 11 is a detailed sectional fragmentary view of a portion of a cover to illustrate the valve for controlling the introduction of a fluid between panels of which the section is assembled.

Fig. 12 is a view similar to Fig. 11 showing the cover portion and a portion of the vehicle frame in completely assembled relation, and Fig. 13 shows diagrammatically the body of a vehicle with an open top adapted to be closed by the cover which forms the subject matter of the present invention.

As shown in Figs. 1 and 9, the top of an automobile may be closed by a plurality of sections $a$, $b$, $c$, which, according to the present invention, are slidable approximately in the plane of the roof so as to be extended over the entire roof, Fig. 1, or so as to be moved into superimposed approximately registering relation within a compartment at the rear of the body. When assembled, as shown in Fig. 9, the top of the vehicle is open and permits observation of the surrounding territory by the passengers.

It may become desirable to leave the sections $a$, $b$, $c$ in their serial relation, as indicated in Fig. 1, to cover the top and still to light the interior of the body 1. The sections $a$, $b$, $c$, therefore, may be made of transparent material.

Again, it may become desirable to render the transparent sections opaque and to darken thereby or hide the interior of the vehicle.

For the purpose of rendering the sections transparent, each section is made of transparent panels 2 and 3 which are placed in superposition and spaced from each other so as to enclose a cavity 7 between them. This cavity is marginally closed by providing the panel sections 2, 3 with reinforced marginal flanges extending over the entire circumference of these sections. The reinforcements of the lateral flanges then are advisably also utilized for the application of parts required for slidably moving the several sections relatively to the body 1.

As shown in Figs. 2 and 3, the lateral margins of the panels 2 and 3 are outwardly reinforced to form bulb-like enlargements in cross-section. The two panels are in abutting relation in the faces 4 of these attachment flanges, the panels being held in proper relation by fastening screws 9 which extend through these reinforcements. As shown in Fig. 8, the panels 2 and 3 also separated from each other by the gap or cavity 7 are provided with marginal reinforcing flanges 2', 3' of a slightly different shape in cross-section and also abutting against each other on faces 4 of the panels.

These enlargements of the marginal flanges at the lateral edges of the panel sections also serve for retaining in position rack bars 34 for cooperation with those instrumentalities, whereby a movement of the sections relatively to the body is effected.

Similarly also, the forward and rearward edges of the panels 2 and 3 are formed as flange extensions abutting with each other on the faces 5, as shown in Figs. 4, 5 and 6. Owing to this marginal flange arrangement over the entire contour of each section, the cavities 7 between the panels 2 and 3 of the sections are completely enclosed so as to form fluid-tight containers. Projections 8 extending in the interior of the cavity 7 from the inner face of each panel to the inner face of the other panel serve for retaining the panels 2, 3 in spaced condition. It is, therefore, possible to make these panels of light and transparent material, as for instance, of a transparent plastic material, thereby reducing the weight, leaving the interior of the body in light condition when the sections are in cover position and facilitating the shifting of these sections.

The flange extensions at the front and rear edges of the panels are joined to each other by means of fastening screws 11, as indicated in Fig. 4, and these extensions are constructed for automatic interlocking engagement with serial adjacent sections. For this purpose, the front edge flange of one panel, as for instance, of the panel 2, Fig. 4, and the rear edge of the companion panel 3 are formed into latch members adapted for cooperation with similar latch members of the adjacent section, as shown in Figs. 5 and 6. The projecting latch elements comprise several undercut teeth 6 adapted for cooperation with correspondingly shaped undercut recesses in the next adjacent section of the series. If for instance in Fig. 5, the right hand section is moved from a remote position towards the left, its latching projection 6 will underride the latching projection of the adjacent section, so that the two sections finally occupy the position shown in Fig. 5. The tips of the teeth formed in this latching projection are slightly rounded to facilitate the sliding movement of one section to latching relation with the other section. This rounding of the teeth and corresponding undercut recesses is particularly shown in Fig. 6, as compared with Fig. 5. In the last named figure, each section abuts in a plane substantially at right angle to the plane of the section against the other section, while in Fig. 6, the two sections solely are in engagement with each other along the slanting surfaces of the latching extensions.

The sections illustrated in Figs. 3 and 4 show plane sections, while the fragmentary illustrations of Figs. 5 and 6 show sections which in longitudinal direction are curved in accordance with the curvature of the top of the body 1. The section shown in Figs. 7 and 8 also is curved transversely with respect to the body without in any way interfering with the sliding movement fore and aft to the several sections.

As stated above, the sections are preferably made of light and transparent material but the invention also provides means for rendering these sections opaque through the introduction of a non-transparent fluid into the cavity between the panels of the sections. As shown in Fig. 10, the bulb-like enlargement of a lateral flange is provided at a certain point of the length of the flange with a passage 12 which is extended through the body of the marginal flanges to open into the cavity 7. If, therefore, a darkening or view-obstructing fluid is introduced into the passage 12, it will fill the space 7 between the panels 2 and 3 and render the respective section opaque. For the purpose of automatically admitting this darkening fluid into the cavity between the panels 2 and 3 of a section when the latter has been moved to a predetermined position at the top of the automobile, the structure indicated in Figs. 11 and 12 is provided.

At a portion of the body 1 along which the section is slidable, said body portion is provided with a rocker member 16 pivotally suspended at 17 from the body 1 and equipped with a nipple 22 from which a hose connection, not shown, extends to a source of darkening fluid. Within the rocker member 16, the nipple 22 terminates in a valve 21 which normally is pressed on its seat by the spring 20 so as to prevent the discharge of said fluid from the rocker member even though the source of fluid should have been placed in communication with the hose connection. A bow spring 18 mounted on the pivot member 17 for the rocker is biased so as to have a tendency to swing the rocker in a predetermined direction. The inner end of the bow spring 18 rests against a stop 19 mounted on the body 1. The rocker is held in the position illustrated in Fig. 11 by means of a holding lever 26 which is also pivoted at one end at 27 to the body and which is provided with a hook 28 at the opposite end to engage a companion hook 29 on the rocker member 16. The holding lever 26 is retained in this operative position by means of a stem 24' pivotally connected with the lever 26, and terminating in a knob 24 which projects from the body 1 into the path of the section a, b or c. The stem 24 is yieldingly secured in this position by means of a spring 25 disposed within a recess 23 of the body 1 and acting upon a collar beneath the projecting tip 24 of the stem. In this position of the parts, the movement of the lever 26 into holding position for the rocking member 16 is limited by a stop 30 provided on the body of the vehicle.

The valve 21 in the rocking member is equipped with a rounded head projecting from the rocking member for cooperation with a similar valve head 13 in the section. This valve head also is forced normally into a position closing a valve which communicates with the passage 12 and which lies adjacent a recess 15 in the cover section.

Prior to movement of the cover section to operative position in which the darkening fluid may be introduced into the cavity, the parts therefore, may occupy the position indicated in Fig. 11. Upon a relative sliding movement, as for instance, upwardly in Fig. 11, to that relation of the parts which is indicated in Fig. 12, a portion of the cover a in advance of the recess 15 thereof will act upon the projecting button 24, thereby causing the latching lever 26 to release its hold from the hook 29 on the rocking member. The latter under the influence of the bow spring 18, will be urged in direction towards the cover section a which continues its movement until the recess 15 on the cover section lies in opposition to the rocker member, whereupon the latter by means of the spring 18 will be moved into the recess, as shown in Fig. 12. During this swinging movement of the rocker member 16 about the pivot pin 17, the projecting valve head 21 on the rocker member will encounter the valve head 13 of the cover section a. Both of these valve heads overcoming the tendency of their springs 20 and 14 respectively, will be moved inwardly so as to open the respective valve and to establish thereby communication between the nipple 22 and the passage 12 which is extended to the cavity 7.

The elements for imparting a sliding movement to the several cover sections are shown in Fig. 8 in association with a cover section having a slightly modified lateral flange enlargement. In this modification, the enlargement is provided with projections 2', 3' extending from the outer portion of the enlargement inwardly above and below the cover shown in Fig. 8. This enlarged flange and its projections 2', 3' are guided in a light channel 31, which extends longitudinally of the body adjacent the upper edge thereof, and which is provided with suitable supports 32, 33 for rigidly retaining the top construction with its reinforcing flange in position. A passage 10 extending from the lower guide post 33 of this channel downwardly serves for draining water from the guide channel if the same should have entered this channel.

As in the modification illustrated in Figs. 3 and 10, so also in the embodiment shown in Fig. 8, the lateral marginal enlarged flange served for supporting a rack bar 34 which is in mesh with a pinion 35 supported in a hollow post 1' of the body. It is obvious that upon rotation of the pinion 35, a longitudinal movement will be imparted to the cover. The shaft 36 of the pinion 35 finds a bearing above the pinion, as shown in Fig. 8, and is extended downwardly preferably as a flange of square cross-section to be slidably received within a tubular extension 37, Fig. 1, also retained for rotary movement within the post 1' of the body.

As shown in Fig. 1, a plurality of these actuating shafts 36 and extensions 37 are provided, the latter having at their foot ends, the bevel gears 38 in mesh with bevel gears 41 located on a shaft 39 which extends longitudinally of the body. The shaft 39 may be actuated from the driver's seat in any desired way.

Upon rotating the shaft 39 in predetermined direction, the transmission elements 35 will cause the various covers a, b, c to move backwards underneath a detent 42 which is positioned transversely of the top, and these covers will thereby be introduced into the compartment 43 at the rear of the vehicle. Owing to the arrangement of the detent, the covers successively reaching the compartment 43 will be disposed therein in superposition, as shown in Fig. 9, and will be retained in this relation due to the provision of springs 44, 45 which act upon the top cover c which is the first one to enter the compartment.

The projecting latch extensions shown in Figs. 5 and 6, are of such character that upon stoppage of the cover c first entering the compartment 43, the next adjacent cover b will continue its movement as the latch extension is effective only upon movement of the covers away from each other.

When it is then desired to apply again the series of covers on the top, the operator upon imparting rotation to the shaft 39 in the opposite direction will not only actuate the shafts 36, but also the flexible shaft 46, the pinion 47 of which becomes effective on the front portion of the bottom cover a to move the same forwardly. When the latch extension 6 at the rear end of said cover passes beneath the front extension of the next adjacent cover b, the latter will be forced into latching engagement therewith, and the assembly of covers will then be actuated by the flexible shaft 46 and those shafts 36 which are then in engagement with rack bars 34.

I claim:

1. A detachable cover for vehicles, comprising a plurality of sections made of two sheets of transparent material joined at their edges to provide an inner space between them, the sections being provided at the side joints of their sheets with thickened edges and at the end joints with opposed connection surfaces beyond said end joints, rack bars fixed along the side joints of the two sheets of the sections, longitudinal channels fixed to the sides of the vehicle frame to serve as a support and a guide for the thickened side edges of the cover sections, means for automatically injecting into the inner space of the cover sections a colored fluid apt to render the cover opaque, said means being mounted at one side of the vehicle body to be automatically operated as each section moves forwardly, and driving means mounted at the sides of the vehicle body to mesh with the rack bars of the sections and to cause the latter to move in one direction or the other to be inserted into the vehicle rear portion or to be extended upon the vehicle body in joined position with one another.

2. A detachable cover for vehicles, comprising a plurality of sections made of two sheets of transparent material joined at their edges to provide an inner space between them, one of said sheets having spacing points projecting from its inner face and remaining in contact with the inner face of the other sheet, and the sections being provided at the side joints of their sheets with thickened edges and at the end joints of their sheets with opposed connection surfaces beyond said end joints, rack bars fixed along the side joints of the two sheets of the sections, longitudinal channels fixed at the sides of the vehicle body to serve as a support and a guide for the thickened side edges of the cover sections, means for automatically injecting into the inner space of the cover sections a colored fluid apt to render the cover opaque, said means being mounted at one side of the vehicle body to be automatically operated as each section moves forwardly, means for gathering the cover sections one under the other under the tension of springs tightening one against each other at the rear portion of the vehicle, and driving means mounted at the sides of the vehicle body to mesh with the rack bars of the sections and to cause the latter to move in one direction or the other to be inserted into the vehicle rear portion or to be extended upon the vehicle body in joined position with one another.

3. A detachable cover for vehicles comprising a plurality of sections, each consisting of two coextensive panels spaced from each other to provide a cavity between the same, marginal flanges forming a liquid tight closure for said cavity and marginally reinforcing the panels of each section, rack bars inserted in said flanges, a common means for actuating all of said rack bars, and means on the vehicle for guiding said marginal flanges in a predetermined path of movement along the top of the vehicle.

4. A detachable cover for vehicles, comprising a plurality of sections, each consisting of a pair of panels in superposed relation spaced from each other, each panel being provided with marginal flanges, means for fastening said panels in said spaced superposed relation, said fastening means extending through said flanges, means on the vehicle for maintaining said sections in serial alinement longitudinally of the vehicle on top thereof, and means on the flanges of each section for latching the section to the next adjacent section.

FAUSTINO JOSÉ FERNÁNDEZ SOLIS.